US011153848B2

(12) United States Patent
Hoferer et al.

(10) Patent No.: US 11,153,848 B2
(45) Date of Patent: Oct. 19, 2021

(54) FIELD DEVICE AND METHOD FOR PROVIDING BROADCAST INFORMATION

(71) Applicant: VEGA GRIESHABER KG, Wolfach (DE)

(72) Inventors: Christian Hoferer, Offenburg (DE); Manfred Metzger, Haslach im Kinzigtal (DE); Juergen Haas, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 16/475,891

(22) PCT Filed: Jan. 8, 2018

(86) PCT No.: PCT/EP2018/050350
§ 371 (c)(1),
(2) Date: Jul. 3, 2019

(87) PCT Pub. No.: WO2018/130492
PCT Pub. Date: Jul. 19, 2018

(65) Prior Publication Data
US 2019/0349890 A1   Nov. 14, 2019

(30) Foreign Application Priority Data

Jan. 10, 2017   (DE) .................... 10 2017 100 348.7

(51) Int. Cl.
*H04W 72/00* (2009.01)
*H04W 4/38* (2018.01)
(Continued)

(52) U.S. Cl.
CPC ........ *H04W 72/005* (2013.01); *G05B 19/042* (2013.01); *H04Q 9/00* (2013.01);
(Continued)

(58) Field of Classification Search
CPC ........ G05B 19/042; G05B 2219/23406; H04Q 9/00; H04Q 2209/43; H04Q 2209/82; H04W 4/38; H04W 12/003; H04W 72/005

See application file for complete search history.

(56) References Cited

U.S. PATENT DOCUMENTS 10,136,246 B2 * 11/2018 Yamada ................. H04W 12/04
2009/0224906 A1    9/2009 Balgard et al.
(Continued)

FOREIGN PATENT DOCUMENTS

DE   10 2009 010 730 A1   10/2009
DE   10 2014 106 727 A1   11/2015
(Continued)

OTHER PUBLICATIONS

International Search Report dated Mar. 26, 2018 in PCT/EP2018/050350 filed Jan. 8, 2018.
German Search Report dated Dec. 8, 2017 in corresponding German Patent Application No. 10 2017 100 348.7 (with English Translation of Category of Cited Documents), 10 pages.

*Primary Examiner* — Thomas R Cairns
(74) *Attorney, Agent, or Firm* — Oblon, McClelland, Maier & Neustadt, L.L.P.

(57) ABSTRACT

A field device for process automation, comprising a short-range wireless communication circuit having a mobile communication device and a control circuit for controlling the communication circuit. The control circuit selects data stored in the field device, instructs the communication circuit to transmit the selected data in a publicly available broadcast mode, establishes a short-range communication connection with the mobile communication device, and uses configuration data that the mobile communication device has sent to the field device after establishing the short-range
(Continued)

communication connection in order to change the selection of data sent out in the publicly available broadcast mode or to stop the broadcast mode.

13 Claims, 2 Drawing Sheets

(51) Int. Cl.
    *G05B 19/042*     (2006.01)
    *H04Q 9/00*     (2006.01)
    *H04W 12/50*     (2021.01)

(52) U.S. Cl.
    CPC .............. *H04W 4/38* (2018.02); *H04W 12/50* (2021.01); *G05B 2219/23406* (2013.01); *H04Q 2209/43* (2013.01); *H04Q 2209/82* (2013.01)

(56) References Cited

U.S. PATENT DOCUMENTS

| | | |
|---|---|---|
| 2012/0161978 A1 | 6/2012 | Sakurai |
| 2013/0227575 A1 | 8/2013 | Jensen et al. |
| 2014/0036712 A1 | 2/2014 | Dewey et al. |
| 2015/0276432 A1 | 10/2015 | Repyevsky et al. |
| 2016/0063785 A1 | 3/2016 | Benkert et al. |
| 2016/0314685 A1 | 10/2016 | Sandoval-Castillo et al. |

FOREIGN PATENT DOCUMENTS

| | | |
|---|---|---|
| DE | 10 2014 112 611 A1 | 3/2016 |
| WO | WO 2016/172152 A1 | 10/2016 |

\* cited by examiner

FIELD DEVICE AND METHOD FOR PROVIDING BROADCAST INFORMATION

REFERENCE TO RELATED APPLICATIONS

The present application claims the priority of German Patent Application No. 10 2017 100 348.7 filed on Jan. 10, 2017, which is incorporated herein in its entirety by reference.

FIELD OF THE INVENTION

The invention relates to the field of process automation. In particular, the invention relates to a field device for process automation, such as a level gauge, a method for providing broadcast information to a mobile communication device, a program element and a computer-readable medium.

BACKGROUND

Level gauges will be increasingly included in networks in the future. Especially in the context of Industry 4.0, modern level gauges feature new, wireless connection adapters that can be used to communicate with the level gauges. Bluetooth Low Energy (LE) or Bluetooth Smart is becoming increasingly important here as many smartphones and tablet PCs are equipped with this technology. Added to this is the low energy consumption, which is particularly advantageous for the classic 4 . . . 20 mA power supply of level gauges.

In order to query measurement data of a field device, a wireless communication connection with the field device can be set up via Bluetooth in that the field device and the mobile communication device exchange dial-up data. This process is also referred to as pairing. Once a secure communication connection has been established, measurement data can be retrieved in the field device or parameterisation data can be sent to the field device.

SUMMARY

There may be a desire to simplify the exchange of information between a field device and a mobile communication device.

A first aspect relates to a field device configured to provide process automation, such as a level gauge, a pressure gauge, a level detector, a flow meter or another sensor that can be used in process automation. The field device has a communication circuit configured for wireless short-range communication with a mobile communication device, for example, a smartphone or a tablet PC. In addition, a control circuit is provided which controls the communication circuit and can select data in the field device that are present there, that is, for example, retrievable from the RAM or otherwise stored. These data may then be transmitted via the communication circuit in the form of a publicly available broadcast transmission mode to be received by very different mobile receiving devices. Pairing is not required for this. In addition, the control circuit is programmed to instruct the communication circuit to establish a short-range communication connection with the mobile communication device, after which configuration data can be received from the mobile communication device that have been sent by the mobile communication device to the field device after establishing the short-range communication connection. These configuration data are used to modify the selection of the data to be transmitted in the publicly available broadcast mode, or even to stop the broadcast mode.

In other words, the user of a mobile phone, having set up a secure radio connection with the field device, can determine which data are to be provided by the broadcast mode.

The broadcast mode is, for example, a Bluetooth advertising mode.

The data to be selected by the control circuit may be defined by a configuration value stored in a non-volatile memory of the field device. This configuration value can be changed by the control circuit if the mobile communication device has sent a correspondingly new configuration value to the field device.

Another aspect relates to a process automation system having a plurality of field devices described above and below and at least one mobile communication device.

Another aspect relates to a method for providing broadcast information to a mobile communication device. The method comprises the following steps: Selecting data stored in a field device; instructing a communication circuit of the field device to transmit the selected data in a publicly available broadcast mode; establishing a short-range communication connection with the mobile communication device; using the configuration data sent by the mobile communication device to the field device after establishing the short-range communication connection to change the selection of the data broadcast in the publicly available broadcast mode or stop the broadcast mode.

A further aspect relates to a program element which, when executed on a control unit of a field device, instructs the field device to perform the steps described above and below.

A final aspect relates to a computer readable medium having stored thereon a program element as described above.

In the following, further embodiments will be described with reference to the figures. The illustrations in the figures are schematic and not to scale.

DETAILED DESCRIPTION OF THE EXEMPLARY EMBODIMENTS

Figure 1:
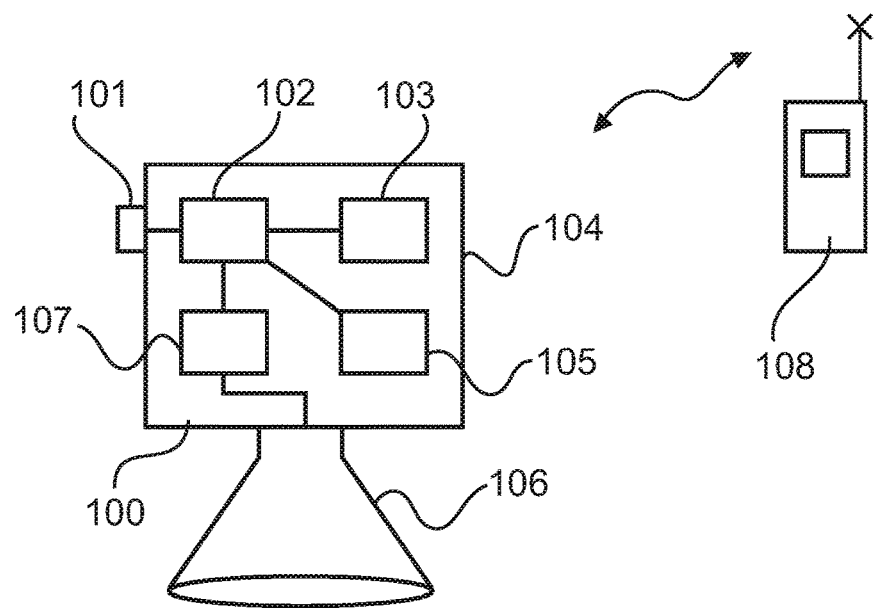
FIG. 1 shows a process automation system according to an exemplary embodiment.

FIG. 1 shows an example of a radar level gauge 100, which implements aspects of an embodiment. In a housing 104 is a control unit 102, a wireless communication transmitting and receiving module 103, a non-volatile memory 105 and a device for generating a radar pulse, which is transmitted via the antenna 106 and received again in order to measure the distance to a filling material.

Optionally, there is a selector switch 101 on the sensor, with which the publicly available data transmission (broadcast, in Bluetooth: advertising information) can be controlled.

The commissioning of such a sensor via a wireless connection is based on a Bluetooth LE communication as follows: The sensor will start the Bluetooth connection after or during the boot procedure. Subsequently, the broadcast information (Advertising) will be broadcast. This informs each receiver of the presence of the sensor. By default, the device name and an ID that uniquely identify the sensor serve as broadcast information. In addition, further information such as the measured value may be contained in an advertising data packet.

If a receiver 108 wants to connect to the sensor in order to obtain further information or even parameterise the sensor, a secure encrypted bidirectional communication connection between the sensor and the smartphone 108 can be established in a next step. This process is called pairing. Two devices that have successfully completed this procedure will automatically recognize each other the next time a connection is established. In order to establish the connection, the operator must normally enter a PIN on his smartphone, which is checked by the sensor. Only a valid PIN ensures that a stable and secure wireless communication connection between the sensor and smartphone can emerge. The PIN allows the user to authenticate to the sensor. The PIN itself may be defined in the operating instructions, for example, and could also be changed by the user after successful authentication.

Figure 2:
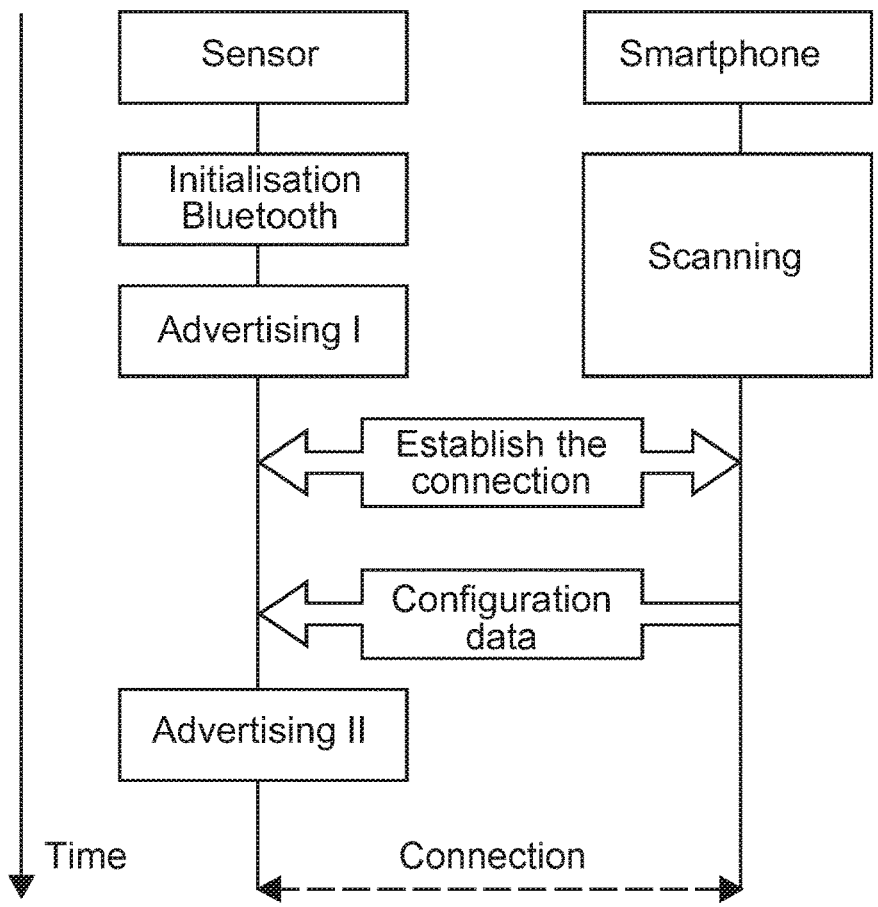
FIG. 2 shows a flowchart of a method according to an exemplary embodiment.

FIG. 2 shows the time sequence of a Bluetooth connection setup between a sensor and a smartphone in the form of an exemplary method. The sensor firstly initializes its Bluetooth hardware and software to send broadcast information subsequently. In FIG. 2, this step is labeled Advertising I.

At the same time, a smartphone can perform a scanning operation (scanning) to search for Bluetooth devices. If a device has been detected, a fixed, encrypted, bidirectional connection can be established between the sensor and the smartphone. Using this connection, parameters (measured values, device status, configuration) can be queried or settings can be applied to the sensor.

The method provides that a user transmits specific configuration data to the sensor, which make a switch of the advertisement. The sensor then selectively switches the broadcast information, which is made clear in FIG. 2 with the function block Advertising II. The dashed connection symbolizes that the sensor and the smartphone are firmly linked. Another smartphone can neither disturb nor read this connection. The second smartphone can only receive the Advertising II data and if necessary also authenticate to the sensor.

The settings made for Advertising II are stored persistently in the sensor, e.g. in a non-volatile memory 105 (cf. FIG. 1).

Figure 3:
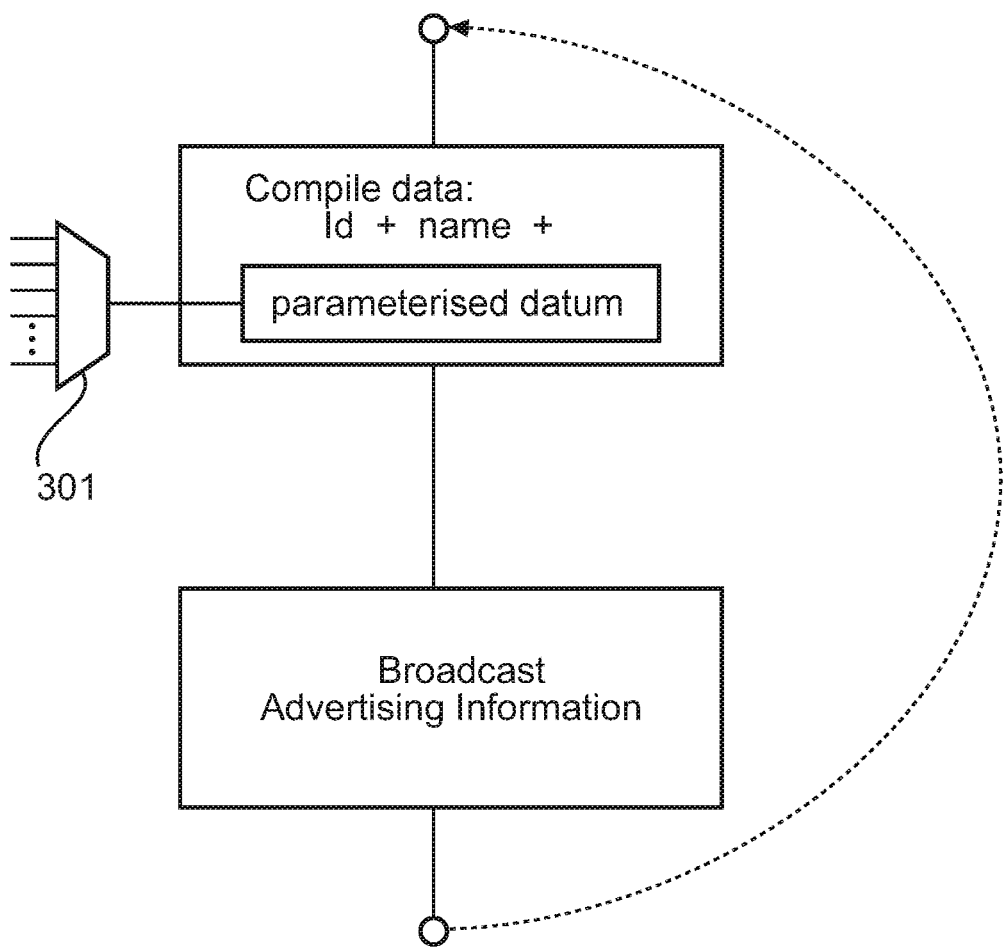
FIG. 3 shows details of the switchable advertising data.

FIG. 3 illustrates the details of the switchable advertising data. As a first step, the data to be published will be compiled. As an established standard, a unique ID and a name are provided here.

In addition, further information can be added. For example, this is a parameterised datum. FIG. 3 also shows a switching device 301, here in the form of a multiplexer, which allows to change the parameterised datum.

The selected data and thus the input parameters of the multiplexer can be measured values of the sensor (level, interface, percentage, linearized percentage value, temperature, medium property), the device status (error status, maintenance required), diagnostic values (electronics temperature, device temperature, service life, remaining time) or fixed quantities (sensor location, sensor name, sensor day). Alternatively, the data may be blank or even the ID or name may be changed.

A further function block can be provided before or after the multiplexer, which itself can be parameterised and at which a unit conversion can be set (distance or level in m, cm, mm, feet, inches, temperature in Celsius, Fahrenheit).

A great advantage of at least some embodiments is that an administrator can set the sensor itself so that it can decide which part of the data should be publicly accessible and which part of the data is accessible only to an operator who can authenticate to the sensor. For example, the current level may contain critical data protected information, whereas the device status should be accessible to a service team. The administrator authenticates to the sensor. This means that a pairing is also carried out so that a protected connection is established. He then sets the sensor so that only the device status is present in the advertising data. He himself can continue to query the fill level via his protected connection, whereas all other receivers can only receive the device status freely. If another user wants to know detailed information (fill level or more than just the device status) from the sensor, in this case he can also authenticate on the device.

From this, another use case can be derived: A first administrator can prevent further advertising after establishing a connection between sensor and smartphone. In FIG. 2 in this case the block advertising II would no longer exist. The sensor can in this case only be operated with the first smartphone.

An extension of the invention provides a hardware switch 101 which drives the multiplexer of FIG. 3 and thus provides for the selection of the broadcast data.

In addition, it should be noted that "comprising" and "having" does not exclude other elements or steps, and the indefinite articles "a" or "an" do not exclude a plural form. It should also be appreciated that features or steps described with reference to any of the above exemplary embodiments may also be used in combination with other features or steps of other exemplary embodiments described above. Reference signs in the claims are not to be considered as limitations.

The invention claimed is:

1. A field device for process automation, comprising:
    a communication circuit configured to communicate via wireless short-range communication with a mobile communication device;
    a control circuit for controlling the communication circuit, configured to:
        select data available in the field device,
        instruct the communication circuit to send the selected data in a publicly available broadcast mode,
        establish a short-range communication connection with the mobile communication device, and
        use configuration data that the mobile communication device has sent to the field device after establishing the short-range communication connection in order to change the selection of the data that are sent in the publicly available broadcast mode;
    wherein the data to be selected by the control circuit are defined by a configuration value stored in a non-volatile memory of the field device; and
    wherein the field device is a level gauge, a pressure gauge, a level detector or a flow meter.

2. The field device according to claim 1,
    wherein the broadcast mode is a Bluetooth Advertising mode.

3. The field device according to claim 1,
    wherein the communication connection is a secure communication connection.

4. The field device according to claim 1,
    wherein the configuration data sent by the mobile communication device to the field device after the establishment of the short-range communication connection include a new configuration value by which the configuration value stored in the memory is replaced by the control circuit.

5. A process automation system, comprising:
a plurality of field devices according to claim 1; and
a mobile communication device.

6. A method for providing broadcast information to a mobile communication device, comprising:
selecting data stored in a field device;
instructing a communication circuit of the field device to transmit the selected data in a publicly available broadcast mode;
establishing a short-range communication connection with the mobile communication device; and
using configuration data that the mobile communication device has sent to the field device after establishing the short-range communication connection, changing the selection of data sent in the publicly available broadcast mode;
wherein the selected data are defined by a configuration value stored in a non-volatile memory of the field device; and
wherein the field device is a level gauge, a pressure gauge, a level detector or a flow meter.

7. The method according to claim 6,
wherein the broadcast mode is a Bluetooth Advertising mode.

8. The method according to claim 6,
wherein the communication connection is a secure communication connection.

9. The method according to claim 6,
wherein the configuration data sent by the mobile communication device to the field device after the establishment of the short-range communication connection include a new configuration value by which the configuration value stored in the memory is replaced.

10. A non-transitory computer readable medium having stored thereon a program element that, when executed on a control circuit of a field device, instructs the field device to perform a method comprising:
selecting data stored in a field device;
instructing a communication circuit of the field device to transmit the selected data in a publicly available broadcast mode;
establishing a short-range communication connection with a mobile communication device;
using configuration data that the mobile communication device has sent to the field device after establishing the short-range communication connection, changing the selection of data sent in the publicly available broadcast mode;
wherein the selected data are defined by a configuration value stored in a non-volatile memory of the field device; and
wherein the field device is a level gauge, a pressure gauge, a level detector or a flow meter.

11. The non-transitory computer readable medium according to claim 10,
wherein the broadcast mode is a Bluetooth Advertising mode.

12. The non-transitory computer readable medium according to claim 10,
wherein the communication connection is a secure communication connection.

13. The non-transitory computer readable medium according to claim 10,
wherein the configuration data sent by the mobile communication device to the field device after the establishment of the short-range communication connection include a new configuration value by which the configuration value stored in the memory is replaced by the control circuit.

\* \* \* \* \*